PRODUCTION OF THIN ORGANIC POLYMER
BY SCREENED GLOW DISCHARGE
Filed April 29, 1964

INVENTORS
Bernard G. Carbajal III
BY Buford G. Slay, Jr.
D. Carl Richards
Attorny United States Patent Office 3,318,790
Patented May 9, 1967

3,318,790

PRODUCTION OF THIN ORGANIC POLYMER BY SCREENED GLOW DISCHARGE

Bernard G. Carbajal III and Buford G. Slay, Jr., Richardson, Tex., assignors to Texas Instruments Incorporated, Dallas, Tex., a corporation of Delaware
Filed Apr. 29, 1964, Ser. No. 363,523
2 Claims. (Cl. 204—168)

This invention relates to the formation of thin organic polymer films, and more particularly to the formation of films in a glow discharge in the region of a perforated electrode.

It has been found that the polymerization of organic materials in an alternating current glow discharge is a useful method for deposition of organic films. Thin organic polymer films have also been prepared by a low voltage electron bombardment. In glow discharge polymerization, it has been found that all surfaces in the vicinity of the glow become covered with a thin polymer film. The action is of such nature that materials not normally considered as polymer precursors, such as naphthalene or anthracene, readily form polymers in a glow discharge.

The present invention is directed particularly to the problem of providing a thin polymer film of an organic material of uniform thickness over the surface of a body which may be either a conductor, a semiconductor, or an insulator. The invention is further directed to the production of a thin flexible insulating film which will withstand temperature cycling over extreme ranges.

More particularly, in accordance with the present invention, there is provided a method of coating a body with a thin organic film which includes evacuating reaction zone. An organic polymer precursor is introduced into the zone. A glow discharge is established between a pair of conductors which are confronting one another. A body to be coated is supported in the zone on the side of the cathode opposite the anode.

In accordance with a further aspect, a system is provided for coating a body with a thin flexible organic polymer film. A structure forming an evacuated reaction zone has a first conductive electrode mounted therein. A second conductive electrode which is perforated forms a cathode. The second electrode is mounted in the zone parallel to, and in juxtaposition with respect to, the anode. Means are provided for applying a voltage between said electrodes with the cathode electrode of polarity which is negative with respect to the anode. An insulator means supports the body to be coated on the side of said cathode opposite the anode and closely adjacent thereto. Supply means provide a vaporized organic polymer precursor within said reaction zone for polymerization in the field between the electrodes and for deposit on the body behind the cathode.

For a more complete understanding of the present invention and for further objects and advantages thereof, reference may now be had to the following description taken in conjunction with the accompanying drawings in which.

Figures 1, 2, 3, 4:
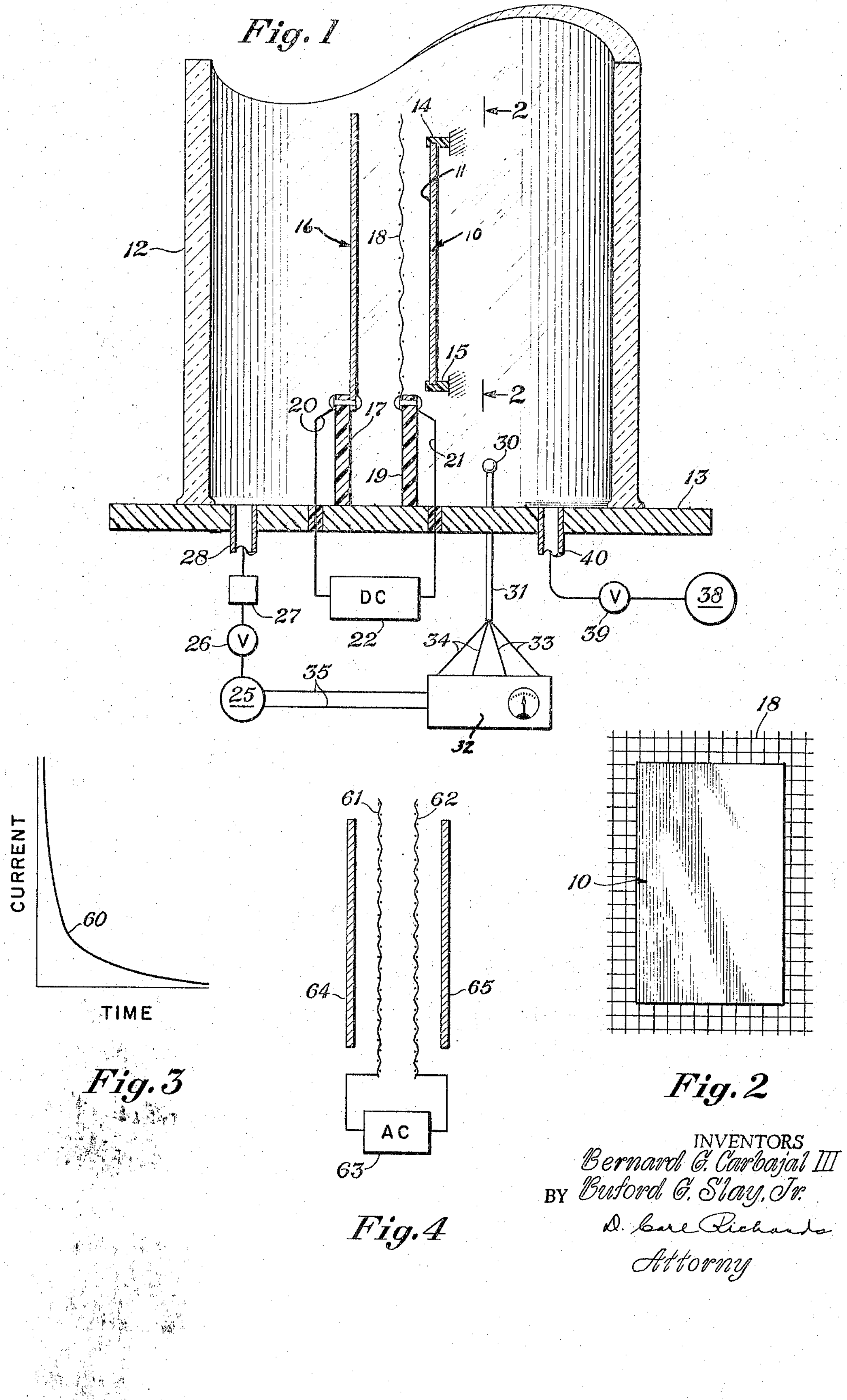
FIGURE 1 is a sectional view showing one system for carrying out the present invention.
FIGURE 2 is a view taken along line 2—2 of FIGURE 1.
FIGURE 3 is a graph illustrating one mode of operation of the unit of FIGURE 1.
FIGURE 4 illustrates a modification of the invention.

FIGURE 1 illustrates a system for carrying out the present invention, in which a thin organic polymer film is to be deposited on the surface 11 of the body 10. The polymerization reactions are carried out within an evacuated zone in a bell jar 12 which is sealed onto a base plate 13. The body 10 is mounted in holders 14 and 15 which are supported by suitable means (not shown) electrically insulated from the base plate 13.

A pair of electrodes are positioned in jar 12. An anode 16 is mounted on an insulator 17. Anode 16 in this embodiment is a sheet of aluminum which may be two inches wide, six inches tall and one-fourth inch thick. It is mounted about two inches above the base plate 13. The cathode 18 is an electrically conductive screen, e.g., aluminum, of length and width equal to the length and width of the anode 16. The cathode 18 is supported by an insulator 19. The anode 16 and cathode 18 are mounted facing one another and spaced apart about three quarters of an inch.

Conductors 20 and 21 connect the electrode 16 and 18, respectively, to the positive and negative terminals of a high unidirectional voltage source 22. By applying a high voltage to the electrodes 16 and 18, a glow discharge is produced therebetween.

As shown in FIGURE 2, the body 10, in the form illustrated, is a conductor, the surface 11 of which is to be coated. The body 10 has dimensions smaller than the dimensions of the cathode 18 and is positioned adjacent the side of the cathode 18 opposite the anode 16 so that the axis of at least one opening in the perforate cathode 18 is being directed to the body 10. By using a screen electrode for the cathode, the film deposited on body 10 is a thin uniform film. In accordance with the invention, an evacuating pump 25 is connected by way of a valve 26 and a suitable cold trap 27 to an exhaust line 28 leading through the base 13. A thermocouple pressure guage 30 is mounted on the base of the bell jar with a cable 31 passing through the base 13 to a control unit 32. The pressure gauge 30 includes a heat source and a temperature sensing element. Heating current is applied by way of conductors 33 to a heater element in unit 30. The heat transfer to a thermocouple element in unit 30 will then depend upon the pressure inside the bell jar 12. The temperature dependent signal is then applied by way of conductors 34 to the control unit. The control unit 32 controls the evacuating pump 25 by means of channel 35.

A storage tank 38 of organic source material is connected by way of valve 39 to an inlet port 40 leading into the bell chamber.

In using the system illustrated in FIGURES 1 and 2 for polymerization of liquid samples in the glow discharge, the vacuum pump 25 is energized until the system is reduced to its ultimate pressure of less than $10^{-2}$ torr. Organic vapor is then introduced by opening valve 39 until the desired pressure rise is obtained. The pressure rise normally would be from an initial level up to a reaction pressure of about 0.3 torr. The system is then allowed to stabilize at the desired pressure for about ten or fifteen minutes before the voltage from source 22 is applied to the electrodes 16 and 18 to initiate the glow discharge.

The "turn-on" voltage, or voltage at which the glow is initiated is dependent upon the pressure, geometry of the system and the material to be polymerized. For a given system, the "turn-on" voltage is characteristic for each material. The voltage for the D.C. glow is set at a predetermined value above the "turn-on" voltage and the glow discharge polymerization is then allowed to continue for either a predetermined time or until the glow turns itself off by depletion of the coating material within the jar.

Typical voltages and pressures are recorded in Table I for various compounds suitable for coating purposes.

TABLE I

| Compound | Initial Voltage | Pressure (torr) |
|---|---|---|
| Ferrocene | 275, 310 | 0.200, 0.100 |
| Vinylferrocene | 340 | 0.100 |
| Styrene | 295 | 0.300 |
| Methylmethacrylate | 345 | 0.300 |
| Naphthalene | 310, 365 | 0.250, 0.200 |
| Anthracene | 270 | 0.100 |
| Vanadyl trisacetylacetonate | 300 | 0.200 |

Conductivity measurements made on some of the polymer films produced in accordance with the invention are recorded in Table II. The values are only approximate due to the difficulty in accurately measuring resistivity in the range of interest. They refer to the minimum bulk resistivity for a polymer film.

TABLE II

| Polymer precursor: | Resistivity |
|---|---|
| Ferrocene | ohm-cm $5\times10^{12}$ |
| Naphthalene | ohm-cm $8\times10^{16}$ |
| Anthracene | ohm-cm $5\times10^{13}$ |

With the exception of ferrocene and vinylferrocene, all of the compounds in Table I will form protective films on the cathode. With the system set at a given voltage, the deposit of the protective film will cause the glow to decay or die. A typical current vs. time relationship is plotted in FIGURE 3, where the curve 60 shows that, with the establishment of a glow discharge at time=zero, the current flowing between the electrodes 16 and 18 are relatively high but rapidly decreases to a value approaching zero. Thus, the glow discharge will die out at some time after its initiation. If desired, film thickness may be controlled by removing or disconnecting the voltage source from the electrodes at some time prior to the time that the discharge naturally would be extinguished. For the materials that form a suitable polymer, the film thickness on the cathode is a function of the voltage at which the glow decays or dies. For a given geometry, control of the film thickness on a substrate placed behind the screen can be obtained. Film thickness of the order of 0.1 to 1.0 micron have been found to be readily achieved.

Many of the polymers have been found to exhibit a photoconductive effect. That is, the conductivity of the film increases by one or more orders of magnitude under the influence of ultraviolet light. The response is markedly greater for short wavelength light than for longer wavelength light. With the exception of the vanadium chelate polymer, the effect appears to be general. The intensity of the photoconductive effect varies depending upon the polymer precursor.

While glow discharge polymerization has heretofore been carried out, it has been found that the use of the screen cathode, which casts its shadow onto the body to be coated, permits the formation of a uniform, thin continuous film. In general, the films formed are clear and colorless, exhibiting typical interference colors related to thickness and refractive index. The polymers have a dielectric constant of about 3.2. On smooth surfaces, the polymer films appear to have very uniform surface characteristics and are highly adherent to the body on which they are formed. The polymer films thus produced have been found to withstand repeated cycling from room temperature to liquid helium temperature with on apparent loss of the insulating properties.

The screen 18 should be such that the metal portions are preferably of smaller area than the area of the holes through the cathode. Aluminum screen wire of about 10 mesh has been found to be satisfactory. It provides an open pattern through which the plasma may pass. It appears that the field causes acceleration of the particles through the screen onto the body 10. The result is that an even coating will be deposited on the body, whereas if the body were to be placed between the cathode and anode, an uneven coating would be the result. Of course, it is possible to coat a solid conductor by substituting the conductor for the screen cathode. However, semiconductors and insulators as well as conductors can be given uniform coating of high quality and of uniform thickness by accelerating the coating material through an open or reticulated cathode.

Voltages and pressures for carrying out the present invention are generally well understood by those skilled in the art, as indicated by the disclosure of Patent No. 3,068,510 to Coleman.

The system illustrated in FIGURE 1 relates to D.C. operation. FIGURE 4 illustrates an A.C. system in which a pair of screens 61 and 62 are energized from an A.C. source 63 to establish a glow discharge for polymerization of the film-forming material. Bodies 64 and 65 may thus be simultaneously coated. In each case, the electrodes 61 and 62 are screen having areas preferably greater than the area of the bodies 64 and 65. The bodies 64 and 65 are mounted adjacent each electrode on the side away from the other electrode so that at least one opening in the perforate electrode is being directed to the body.

It is important to note that by the use of a perforated or screen-like electrode, any type of body can be coated. For example, in complex structures in which conductors overlay insulators, the entire face of such a body can be coated uniformly by depositing the film-forming polymer onto the body after passage through the screen electrode. The invention is particularly useful in applying coatings to insulating bodies or semiconductor bodies having active and passive elements formed therein and interconnected by conductive paths applied to the surface. Such a body may be supported in an evacuated reaction zone into which an organic polymer precursor is introduced. The glow discharge is then established in the zone between two spaced apart electrodes of opposite polarity, both of which are located in front of or to one side of the body. The organic polymer formed by the glow discharge then passes through the plane adjacent to the body for deposit on the body. Preferably, the plane is established by the application of a potential to a perforated or screen electrode which will perform the dual function of permitting the establishment of a glow discharge for polymerization and the movement of the resultant polymer with substantially unimpeded flow from the region between the two electrodes to the location of the body which is in the shadow of the screen electrode.

While the foregoing description has related to systems in which the electrodes and the bodies have planar surfaces, it will be appreciated that complex surfaces may be coated and that the configuration of the electrodes can be varied from the planar configuration where necessary in order to accommodate complex surfaces to be coated.

Having described the invention in connection with certain specific embodiments thereof, it is to be understood that further modifications may now suggest themselves to those skilled in the art and it is intended to cover such modification as fall within the scope of the appended claims.

What is claimed is:

1. The method of applying a polymer coating to a body which comprises:

(a) supporting said body in an evacuated reaction zone, (b) introducing an organic polymer precursor into said zone, (c) positioning two confronting electrodes in said zone substantially in parallel spaced apart relationship, at least one of said electrodes being perforate and being interposed between said body and the other electrode so that the axis of at least one opening in said perforate electrode is being directed to said body, and (d) establishing a glow discharge in said zone between two said electrodes whereby an organic polymer is formed by the glow discharge and passes through said perforate electrode for deposit on said body.

2. The method of claim 1 wherein the organic polymer precursor is a member selected from the group consisting of ferrocene, vinylferrocene, styrene, methylmethacrylate, naphthalene, anthracene and vanadyl trisacetylacetonate.

References Cited by the Examiner

UNITED STATES PATENTS

| | | | |
|---|---|---|---|
| 3,021,271 | 2/1962 | Wehner | 204—29 |
| 3,068,510 | 12/1962 | Coleman | 204—16 |
| 3,069,283 | 12/1962 | Coleman | 204—16 |
| 3,155,629 | 11/1964 | Tobin | 204—16 |

FOREIGN PATENTS

| | | |
|---|---|---|
| 939,275 | 10/1963 | Great Britain. |

OTHER REFERENCES

Chemical Engineering, Sept. 2, 1963, pp. 27 and 28.

JOHN H. MACK, *Primary Examiner.*

R. MIHALEK, *Assistant Examiner.*